United States Patent [19]

Brown et al.

[11] 4,430,526

[45] Feb. 7, 1984

[54] INTERACTIVE GRAPHICS TRANSMISSION SYSTEM EMPLOYING AN ADAPTIVE STYLUS FOR REDUCED BANDWIDTH

[75] Inventors: Earl F. Brown, Piscataway; Arthur B. Larsen, Colts Neck, both of N.J.

[73] Assignee: Bell Telephone Laboratories, Incorporated, Murray Hill, N.J.

[21] Appl. No.: 342,112

[22] Filed: Jan. 25, 1982

[51] Int. Cl.³ ............................................. G08C 21/00
[52] U.S. Cl. ...................................... 178/18; 178/87; 340/707; 235/472
[58] Field of Search .................. 178/18, 19, 20, 17 D, 178/87; 340/707, 708; 346/139 C; 250/341, 221; 200/61.45 R, 61.52; 235/472

[56] References Cited

U.S. PATENT DOCUMENTS

| | | | |
|---|---|---|---|
| 3,553,362 | 1/1971 | Mounts | 178/6 |
| 3,761,620 | 9/1973 | Graven | 178/18 |
| 4,251,800 | 2/1981 | Sanner et al. | 235/472 X |
| 4,263,592 | 4/1981 | Takahashi et al. | 340/707 |
| 4,268,730 | 5/1981 | Higgins et al. | 200/52 R |
| 4,289,927 | 9/1981 | Rodgers | 178/19 |

OTHER PUBLICATIONS

D. L. Dietmeyer; Logic Design of Digital Systems, Allyn & Bacon, 1978, Chapt. 13, pp. 778-844.

R. M. Kline, Digital Computer Design, Prentice Hall, 1977, Chapt. 5, pp. 110-151.

Primary Examiner—Stafford D. Schreyer
Attorney, Agent, or Firm—David H. Tannenbaum

[57] ABSTRACT

An interactive graphics transmission system for use, illustratively, in video teleconferencing is described which advantageously reduces the amount of transmission bandwidth and user effort required to transmit changing graphical information. This is accomplished by first transmitting a full image of the graphic followed only by the changes which a conferee makes to that graphic. Those changes are determined by sensing the tilt of a light pen and the location of its tip, which is closest to the graphic, as a conferee manipulates the pen to change the graphic. The tilt of the pen primarily determines the mode in which the light pen is used. The mode information, in conjunction with the location of the pen's tip, is used to generate an instruction which specifies the way in which the graphic is to be changed, e.g., whether information is to be added to, deleted from or emphasized in a graphic. In addition, the location of the pen's tip specifies the address of that portion of the graphic that is to be changed. By transmitting just the instruction and address information while the user simultaneously manipulates the light pen to change a graphic, transmission bandwidth and user effort are both advantageously minimized.

31 Claims, 6 Drawing Figures

INTERACTIVE GRAPHICS TRANSMISSION SYSTEM EMPLOYING AN ADAPTIVE STYLUS FOR REDUCED BANDWIDTH

BACKGROUND OF THE INVENTION

1. Field of the Invention

The invention relates to video teleconferencing and, more particularly, to apparatus for an interactive graphics transmission system.

2. Description of the Prior Art

Video teleconferencing is often used where several individuals scattered throughout various remote geographic locations desire to confer together without the necessity to travel to a common locale. With video teleconferencing, each conferee or user is continuously photographed by a video camera in order to be seen by the others, and each conferee sees the others through various video monitors.

During such conferences, graphical information is often discussed and shown, or exhibited, by one or many of the conferees in order to be viewed by the others. Separate video cameras are used to photograph images of the conferees and the graphic being shown. In so-called "continuous presence" video teleconferencing, any conferee must always be able to view the other conferees as well as simultaneously see any graphical information under discussion. A typical transmission over a single communication channel thus contains both a "full-motion" video image of the conferees and graphical information such as, for example, printed pages, charts, or the like. Since the graphic is presumed not to change while it is being discussed, it is typically transmitted with high resolution in a "snapshot" or single-frame mode to reduce its transmission time. At a receiving site, the graphic is usually displayed on a separate monitor.

Oftentimes, it is necessary for a conferee to modify the graphic. A light pen or stylus, operating in conjunction with the graphics transmission system, is frequently used by the conferee to define a desired graphical modification. These modifications could involve the conferee pointing to, i.e., emphasizing, and/or changing, i.e., writing or erasing, selected portions of the graphic. Whenever presently available video teleconferencing systems are used to transmit such a modification, these systems usually transmit the entire graphic including the changed portion. Unfortunately, whenever the graphic is transmitted, the transmitted video image of the conferees is either disadvantageously degraded in proportion to the fraction of the channel bandwidth used to transmit the graphic or, more likely, completely preempted by the transmission of the graphic. Consequently, during these times, each conferee will only see an image of the graphic and will not see an image of the other conferees.

It has been recognized that because the amount of information actually needed to modify the graphic is quite small, a substantial amount of transmission bandwidth is wasted by retransmitting the entire graphic.

One solution which markedly reduces transmission bandwidth is to use a scheme based upon conditional replenishment, i.e., one which transmits an initial video image of the entire graphic followed by the changes occurring in that graphic. See, for example, that shown in U.S. Pat. No. 3,553,362, issued Jan. 5, 1971 to F. W. Mounts. Unfortunately, a conditional replenishment based system transmits all the information contained within the field of view of the video camera which is photographing the graphic. Consequently, much more information is transmitted than just the changes occurring in the graphic. This other information may, for example, be comprised of an image of the conferee, or user, or a portion, e.g., a hand, of the conferee who is changing the graphic and is within the field of view of the camera. Information of this sort is extraneous and, when transmitted, highly wasteful of transmission bandwidth.

It is known that in order to achieve maximum bandwidth reduction, using an existing conditional replenishment based graphical transmission system, the conferee could first change the graphic and then signal the transmission equipment, by, for example, depressing a pushbutton, that the changes are ready to be transmitted. If the graphic is frequently changed, this latter requirement is quite burdensome to the conferee. Moreover, since it necessitates extra effort on the conferee's part, this requirement tends to limit the rate at which the conferee can manually supply changing graphical information to the transmission system.

SUMMARY OF THE INVENTION

Accordingly, it is an object of this invention to transmit changing graphical information without adversely affecting the displayed video images of the conferees.

It is a further object of this invention to transmit changing graphical information in a manner which minimizes transmission bandwidth.

It is another object of this invention to transmit changing graphical information by transmitting only the changes in the graphic.

It is yet another object of this invention to transmit changing graphical information in a manner which requires a minimal amount of user effort.

It is yet another object of this invention to transmit changing graphical information in a manner which does not restrict the rate at which a user can manually supply changing graphical information to the transmission system.

These and other objects are achieved in accordance with this invention by defining any changes to a previously transmitted graphical image substantially in response to the tilt of a stylus, or light pen, and to the location, with respect to the graphic, over which a tip, illustratively the downward tilted tip, of the light pen is held. The tilt of the light pen primarily determines the mode in which the light pen is used. Mode information, along with location information is used to generate an instruction. This instruction uniquely specifies which one of a predetermined variety of graphical transmission operations, e.g., emphasizing, writing or erasing, is to be undertaken. Location information also determines which portions, i.e., addresses, of the previously transmitted graphical image are to be changed. Graphical modifications are transmitted in the form of the appropriate instructions followed by accompanying address information. Such transmissions occur in real-time i.e., substantially at the same time that the conferee manipulates the pen to make the graphical modifications. By transmitting geographical modifications in this fashion, transmission bandwidth is advantageously minimized. Moreover, with this arrangement, the conferee is no longer required to separately signal the transmission system that the changed graphic is ready to be transmitted. Consequently, user effort is substantially reduced and no restriction exists on the rate at which the conferee can manually supply changing graphical information to the transmission system.

In accordance with a specific implementation disclosed herein, detection of both mode and location information is facilitated by incorporating a light source in each of the two tips of the light pen. Whenever either tip of the pen is tilted downward with respect to the other, the light source in the downward tilted tip emits pulsed light of a preselected band of wavelengths. The mode of the pen is determined partially by which end is tilted downward with respect to the other, and this primarily specifies the rate at which the light source pulses. These light pulses are detected by a photodetector and video camera. The latter has a filter placed in front of its input lens. This filter restricts light of all wavelengths except that emitted by the pulsing light source from reaching the optical input of the camera. The photodetector, filtered camera and an associated processing circuit determine the location of the downward tilted tip of the pen—i.e., the addresses (coordinate) of each picture element (pel) on the surface of the graphic which lie under that tip of the pen, and the mode in which the pen is used at that pel. Based upon both this address and mode information, the processing circuit generates an appropriate instruction which specifies how the displayed graphic is to be changed at that address. The instruction followed by its associated address is then transmitted to a receiving site where this information is used to change a displayed image of the previously transmitted graphic.

In accordance with an aspect of the invention, the mode in which the light pen is used is further defined in response both to the tilt of the pen and whether the tip of the pen closest to the graphic is depressed against the graphic.

BRIEF DESCRIPTION OF THE DRAWING

The invention may be clearly understood from a consideration of the following detailed description and accompanying drawing in which.

DETAILED DESCRIPTION

In so-called "continuous presence" video teleconferencing, any conferee must always be able to view the other conferees as well as simultaneously see any graphical information under discussion. Frequently, conferees modify a previously transmitted graphic which is currently under discussion. These modifications can take the form of pointing to, i.e., emphasizing, or changing, i.e., writing or erasing, sections of the graphic.

Unfortunately, in presently existing video transmission systems known to the art and used for the transmission of graphical information, any graphic modification, no matter how small, usually necessitates a complete transmission of the entire graphic including the changed portion. Even though the amount of information actually needed to modify the graphic is quite small, a substantial amount of transmission bandwidth is wasted by retransmitting the unchanged portion of the graphic. It is well known that this disadvantageous result can be eliminated if a conditional replenishment based transmission system is used and if the conferee or user is required to separately signal the transmission system whenever any graphical changes are complete and ready to be transmitted. This latter requirement necessitates additional user effort and thus restricts the rate at which the conferee can manually supply changing graphical information to the transmission system.

The present invention, therefore, is directed to an arrangement for the transmission of changing graphical information which advantageously minimizes the amount of required bandwidth, by reducing the amount of transmitted information to just the changes occurring to the graphic. Advantageously, this arrangement also minimizes any additional user effort required to initiate the transmission of those changes.

Figure 1:
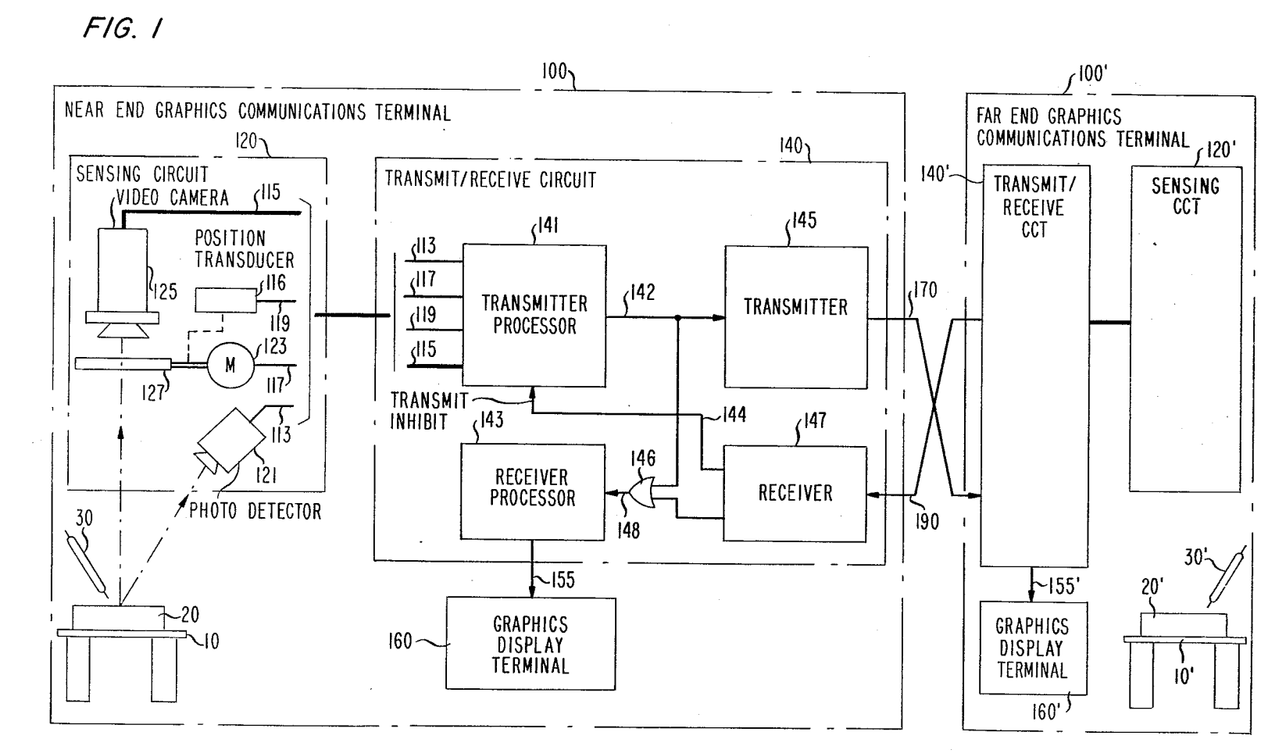
FIG. 1 is a block diagram of a system for the communication of changing graphical information which embodies the principles of the instant invention.

FIG. 1 depicts a graphics communication system according to the principles of this invention.

This system is comprised of two communications terminals: near-end terminal 100 and far-end terminal 100'. Each terminal is joined to the other via a pair of half-duplex transmission lines, i.e., transmission line 170 which carries transmitted signals from the near-end to the far-end terminals and transmission line 190 which carries transmitted signals in the opposite direction. While, for purposes of simplicity, the graphic communication system is described as having only two terminals, there is no limit on the number of terminals that can be connected together, via suitable interconnecting transmission lines, in order to accommodate a multi-party video teleconference. Of course, it will be appreciated that for use in a video teleconference, a separate camera and associated electronics (both not shown) would be connected to the graphics communication system situated at each terminal such that a "full motion" video image of the conferee situated at that terminal could be transmitted to every other terminal. Both this video image and the output of the graphics communication system are transmitted over a common transmission line, illustratively transmission lines 170 or 190.

The system, as described hereinbelow, is capable of performing five distinct graphical transmission operations: erase, write, emphasize, snapshot and restore. The first three operations: erase, write and emphasize are used to change an image of a previously transmitted graphic. The fourth operation, i.e., snapshot, causes a full frame image of the graphic to be transmitted. Lastly, the restore operation reverses the most recent graphical change (erase, write or emphasize) and then causes an image of the graphic, as it existed prior to that change, to be displayed on all the graphical display terminals.

Because the near-end and far-end terminals are completely identical, the following discussion will be limited to a description of near-end terminal 100. This terminal is comprised of sensing circuitry 120, transmit/receive circuitry 140 and graphics display terminal 160. The terminal functions by first transmitting an initial image of the full graphic appearing on the face of document 20, followed in real time by only the modifications made to that graphic. As discussed in detail below, a conferee, situated at the near end makes the modifications using the stylus, or light pen, 30. Scanning circuitry 120 scans portions of the top surface of table 10 and detects information produced by the light pen. This scanning circuit can advantageously be located in any appropriate location having a full view of the top surface of table 10 but not obstructing the conferee's use of light pen 30. Graphics display terminal 160 displays an image of the graphic, as modified, and is appropriately positioned such that the conferee can comfortably view any displayed information.

If a conferee, not shown, desires to transmit the graphical information visible on the face of document 20, he first places the document within a specific region, henceforth called "graphic image area 210" (see FIG. 2) of the top surface of table 10. Document 20 is not limited to single sheets of paper but may be any printed matter, including but not limited to books, magazines, and the like. Video camera 125, located within sensing circuitry 120 and controlled by transmitter processor 141, continuously and sequentially scans the entire graphic image area 210 of table 10 on a pel (picture element) by pel basis and converts all the scanned graphical information visible on the face of document 20 into a video signal. This video signal is applied, via cable 115, to transmitter processor 141.

Once document 20 is placed within graphic image area 210, the conferee can instruct terminal 100, using light pen 30, to transmit a "snapshot," i.e., a full single frame image, of this graphic. Specifically, the user holds light pen 30 in a manner described in detail below, which causes it to emit pulses of light at a predetermined rate. These pulses and their location, with respect to the graphic, are detected by sensing circuitry 120 which in turn applies resulting electrical signals to transmitter processor 141. Located within transmit/receive circuit 140, transmitter processor 141 interprets these signals and, in response thereto, generates an instruction which specifies that a "snapshot" operation is to commence. This information is in turn applied to receiver processor 143, located within transmit/receive circuit 140, and via transmitter 145 and communication line 170, to a similar receiver processor (not shown) located within far end graphics communications terminal 100'. This instruction causes both receiver processors to accept and store a subsequently generated full frame of video information generated by transmitter processor 141. Once transmitter processor 141 generates this instruction, it then stores the video signal produced by video camera 125 until an entire frame of video information has been scanned and stored. This frame of video information—hereinafter referred to as a video frame signal, is then serially applied by the transmitter processor on a pel-by-pel basis via lead 142, to transmitter 145. The transmitter converts both the previously applied instruction and the video frame signal into a form suitable for transmission over transmission line 170. The design of transmitter 145 is well known in the art and transmitter 145 will not be described any further.

After the full frame of video information has been stored within each receiver processor, each receiver processor then converts the stored video frame signal into a form suitable for display, and thereafter applies the result on a pel-by-pel basis to a graphic display terminal, exemplified by graphic display terminal 160 located at the near end.

Once an entire frame of video information has been transmitted, the conferee can use light pen 30 to modify or change the graphic by writing, i.e., adding new information into the graphic, or by erasing, i.e., deleting, or by emphasizing a portion of the existing information comprising that graphic. To make any such graphical change, the user manipulates the light pen in a manner similar to that of a writing instrument as described in detail below. The kind of graphical change, i.e., whether it is a write, erase or emphasize operation, is determined by both the particular mode in which the light pen is used and the location, with respect to the graphic, over which the downward tilted end of the pen is held. The mode of the pen is determined by the combination of the tilt of the light pen, i.e., which one of two ends of the light pen is tilted downward with respect to the other, and whether the tip of the pen located in the downward tilted end—henceforth referred to as the operative tip—is depressed against the surface of the table. Four possible pen modes are thus defined, but as will become apparent shortly, only three of these four possible modes are actually used to define all the graphical transmission operations. The specific information to be written into, erased from or emphasized within the graphic is determined by the location of the operative tip, and more particularly, from the locations of the particular pels comprising the graphic over which the operative tip of pen is positioned.

Figure 2:
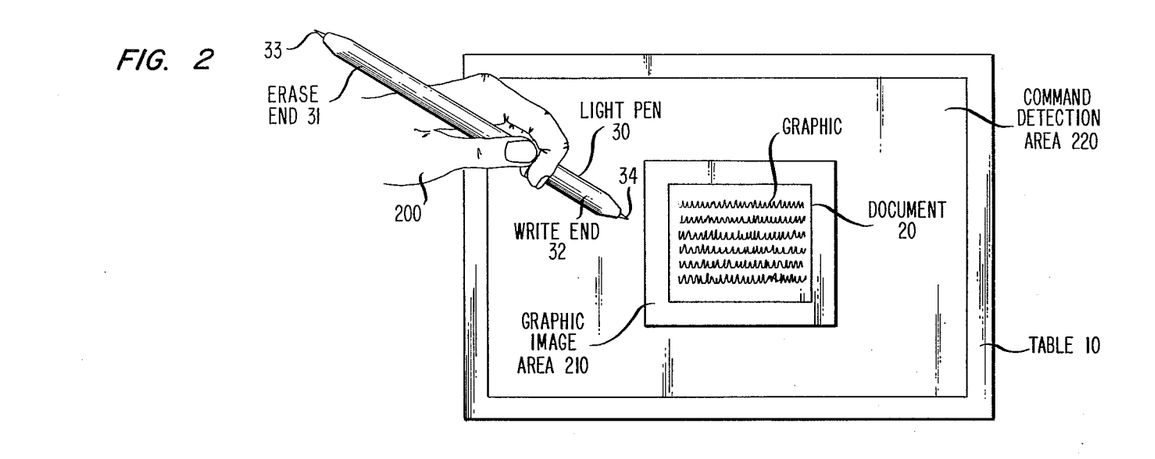
FIG. 2 is a diagram of both a preferred way in which the conferee holds the light pen and the top surface of the conferee's table, with the latter marked to show the areas which lie within the scanning regions of the video camera and the photodetector shown in FIG. 1.

As the operative tip of the pen is held over any pel lying within graphic image area 210, scanning circuitry 120 and, in particular, video camera 115, in conjunction with transmitter processor 141, ascertains the location, i.e., address, of that pel and determines the mode of the pen at that location.

Specifically, whenever an end of light pen 30 (shown in detail in FIG. 3) is tilted downward, a light emitting diode located in that end of the pen—henceforth referred to as the operative end, continuously emits pulsing light at a particular one of a number of possible rates. The rate is dependent upon the particular mode in which the pen is used. Since the housing of the pen is transparent to this light, this light propagates outward from the pen. To advantageously prevent these pulses from distracting the conferee, the wavelength of the light is chosen to fall within a range invisible to humans, e.g., infrared. If the operative end is located above the top surface of table 10 and above a large area of this surface, hereinafter referred to as "command detection area 220" (see FIG. 2), then these pulses are detected by photodetector 121. If the operative end is held above that portion of the command detection area in which the graphic can be placed, i.e., graphic image area 210, then these pulses are detected by both photodetector 121 and video camera 125. However, the video camera does not detect these pulses if the operative end of the pen is held above any location not within the graphic image area 210. Photodetector 121 and video camera 125 apply the detected pulses to transmitter processor 141.

The mode in which the pen is being used is decoded by transmitter processor 141. The decoded mode is dependent not only upon the pulse rate of the light emitted from the pen, but also upon the position of the location within command detection area 220 over which the pen is held—i.e., more specifically, whether the operative end of the pen is held above a location in the command detection area 220 within or outside graphic image area 210. If the decoded mode indicates that a graphical change operation, i.e., write, erase or emphasize, is being made, then transmitter processor 141 applies the necessary power to motor 123, via lead 117, to cause the motor to position filter 127 in front of the lens of video camera 125. Position transducer 116 produces a feedback signal indicative of the current position of the filter to transmitter processor 141. Filter 127 is transparent only to light of the same wavelength as that emitted by light pen 30. Once in position, filter 127 prevents camera 125 from detecting any light emitted from other than the pulsing tip of the pen. Thereafter camera 115, as noted, in conjunction with transmitter processor 141, determines the address of the pel(s) over which the operative tip is held.

From the address and mode information, transmitter processor 141 generates an appropriate instruction for the desired graphical change operation. Thereafter, for any graphical change operation, (write, erase, emphasize), transmitter processor 141 applies a serial signal comprised of the instruction followed by the address, of the associated pel over which the light pen is held, to the inputs of both transmitter 145 and, via gate 146, to receiver processor 143. The output of transmitter 145 is extended via transmission line 170 to far end communications terminal 100' where it is used to properly change the displayed graphic appearing on far-end graphic display terminal 160'. Simultaneously therewith, receiver processor 143 decodes the serial digital signal and, in response thereto, generates appropriate signals over lead 155 to change the image of the graphic displayed on near-end graphics display terminal 160 in accordance with these graphical changes.

In the event the conferee makes an erroneous graphical change, he can eliminate it by manipulating the light pen, as described below, to evoke a restore operation. This operation reverses this graphical change and causes an image of the graphic to be displayed as it existed prior to this, i.e., the most recent, change. Only the receipt of the appropriate "restore" instruction by the receiver processor in both the near end and far end graphics communication terminals is necessary to effectuate this operation. Consequently, only the "restore" instruction is transmitted for this operation.

Incoming graphical information is applied via transmission line 190 to receiver 147 within near-end communications terminal 100. Receiver 147 performs such functions as equalization and demodulation. Since the design of receiver 147 is well known in the art, it will not be discussed any further. The output of receiver 147 is applied to an input of OR gate 146 and from there to the input of receiver processor 143. Receiver processor 143 interprets this incoming information, in the same manner as if it were generated by transmitter processor 141, and causes an entirely new graphic to be displayed or merely changes the image being displayed on graphics display terminal 160 in accordance with the incoming information.

As is evident from the above discussion, receiver processor 143 and graphics display terminal 160 receive information from both transmitter processor 141 and receiver 147. As noted, transmitter processor 141 furnishes locally generated graphical information, and receiver 147 furnishes incoming graphical information, both for display on graphics display terminal 160. Normally, only one of these two sources is actively producing graphical information at any one time. Should both sources simultaneously apply a respective stream of serial graphical information to both inputs of OR gate 146, the resulting "OR'ed" combination would corrupt or distort the graphical information contained in each stream and would most likely cause erroneous information to be displayed on the display surface of display terminal 160. To prevent this condition from occurring, receiver 147, whenever it detects any incoming graphical information appearing on communication line 190, places a high level signal on transmit inhibit line 144. The signal, while high, causes transmitter processor 141 to store any locally generated graphical information and not to apply that information to lead 142. Receiver 147 terminates the high level signal after a short predetermined interval of time has elapsed after the reception of all the incoming graphical information from the far end. This interval is chosen to be sufficiently long to allow the receiver processor to completely process all the incoming information.

FIG. 2 illustrates both a preferred way in which a conferee holds light pen 30 and the top surface of table 10, with the latter marked to show the area within the field of view of photodetector 121 and the area scanned by video camera 125. Specifically, the top surface is divided into two areas: command detection area 220 and graphic image area 210. Command detection area 220 is comprised of the entire portion of the top surface of table 10 which lies within the field of view of photodetector 121 (shown in FIG. 1). Contained within the command detection area is graphic image area 210. The latter is that portion of the top surface which is scanned by video camera 125 (shown in FIG. 1). All the graphical information, e.g., that on the face of document 20, lying within graphic image area 210 is transmitted while any information lying outside of it is not. Should video camera 125 be equipped with a zoom lens, as is commonly used in video cameras for graphic transmission applications to accommodate different sized input documents, the graphic image area 210 will not be restricted to a limited area of the table, but instead will be determined by the setting of the zoom lens and will be essentially that portion of the top surface of table 10 including document 20 which is displayed on graphics display terminal 160 after a "snapshot" image has been taken.

Any of the five graphical transmission operations, namely: emphasize, write, erase, snapshot or restore, can be evoked at any time. As previously discussed, two factors specify which particular operation is to be evoked at any one time: the mode of the pen at that time and whether the operative end is simultaneously held over a location, in command detection area 220, lying within or outside graphic image area 210.

In particular, to emphasize (point to) a portion of the graphic currently being displayed, the conferee tilts the write end of the pen (as shown in FIG. 2) towards the graphic with write end 32 slightly above or in light contact with, but not depressed against, any location within graphic image area 210. To complete this operation, the conferee simultaneously moves tip 34 over all the pels comprising the portion of the graphic to be emphasized. Alternatively, the conferee can write new information into the graphic by first holding the write end downward and above that section of the graphic where the new information is to be added. To complete the operation, the conferee writes the new information in longhand—as if the pen was an ordinary writing instrument—while simultaneously depressing tip 34 against the graphic. To erase a portion of the graphic, the conferee tilts erase end 31 downward towards the graphic with tip 33 depressed against that portion of the graphic to be erased. The conferee simultaneously moves the tip of the erase end over all the pels comprising that portion, as if that end of the light pen was an ordinary pencil eraser. Lastly, the conferee can evoke either a snapshot, or restore operation by depressing the tip of the write or erase ends, respectively, against any location within command detection area 220 but not within graphic image area 210.

Figure 3:
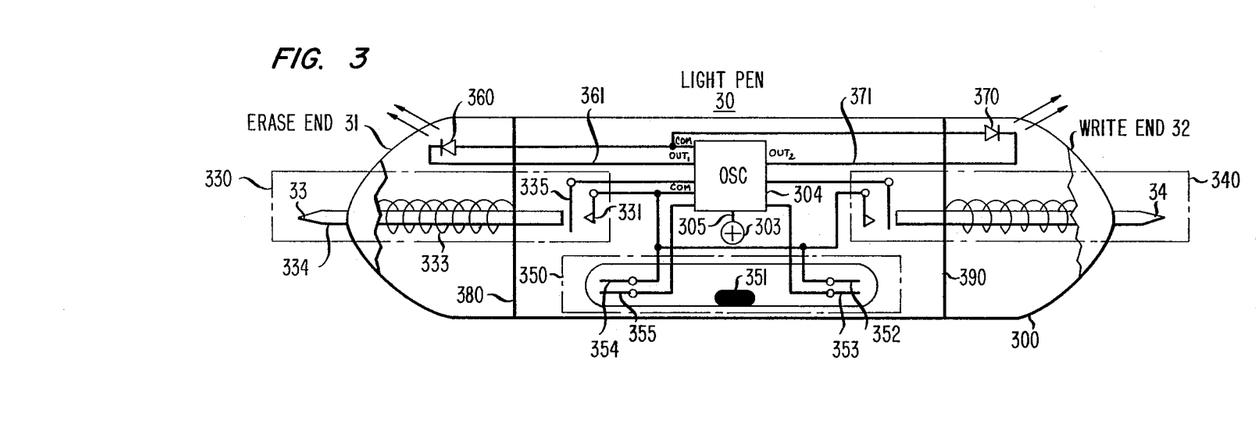
FIG. 3 is a combination pictorial and circuit diagram of light pen 30 shown in FIG. 1.

Light pen 30 is shown in detail in FIG. 3. It is essentially comprised of tilt sensitive switch 350, pressure sensitive switches 330 and 340, battery 303, oscillator 304, and light illuminating devices 360 and 370, all contained within housing 300. Specifically, tilt sensitive switch 350, which is illustratively a mercury switch, has two sets of contacts: one set comprised of contacts 354 and 355, and the other, comprised of contacts 352 and 353. An amount of mercury 351 contained within the switch shorts the former set if the erase end 31 is tilted downward and the tilt (inclination) of the pen exceeds a predetermined threshold. In a similar fashion, the latter set is shorted if write end 32 is tilted downward and the tilt exceeds a predetermined threshold. Each pressure sensitive switch, i.e., switch 330 and switch 340, is located in a corresponding end of the pen, and produces a contact closure whenever the tip of the pen located in that end is depressed against any surface, illustratively the top surface of table 10. All three switches are connected, using a common return lead to oscillator 304. The oscillator has two separate outputs, labelled OUT$_1$ and OUT $_2$, connected to leads 361 and 371, respectively, which are in turn connected to light illuminating devices 360 and 370, which are both, illustratively, infra-red light emitting diodes.

Whenever an end, for example write end 32, of the pen is tilted downward, oscillator 304 generates a continuous stream of pulses at one of two predetermined rates, and applies these pulses only to the light emitting diode (LED 370) located in the downward tilted, i.e., operative, end. The two possible pulse rates which can be applied to this diode are different from those which can be applied to the other light-emitting diode, LED 360. The particular pulse rate applied to the diode in the operative end is further defined by whether the operative tip is depressed against a surface and more particularly whether its associated pressure sensitive switch closes. The resulting pulses of light travel through housing 300 which, in the areas near both light emitting diodes, is made of a material substantially transparent to the wavelength of infra-red light. Battery 303, connected via lead 305, provides the necessary power to operate all the circuitry within the light pen. The following table summarizes the modes in which the light pen can operate along with an illustrative set of pulse rates.

TABLE A

| Mode | Operative End | Operative Tip Depressed | Flashing LED | Pulse Rate |
| --- | --- | --- | --- | --- |
| 1 | WRITE | NO | 370 | .01 sec |
| 2 | WRITE | YES | 370 | .02 sec |
| *3 | ERASE | NO | 360 | .03 sec |
| 4 | ERASE | YES | 360 | .04 sec |

As can be seen, the light pen is capable of operating in four distinct modes. However, as previously noted, the graphic transmission system only requires three of those four modes to perform all five graphical modification operations. Consequently, transmitter processor 141 (shown in FIG. 1) is set to arbitrarily ignore the one mode indicated above by an asterisk (*).

Pressure sensitive switches 330 and 340 are identical. Consequently, in the interest of brevity, only pressure sensitive switch 330 will be described. This switch is comprised of shaft 334, spring 333, retaining wall 380, armature 335 and contact 331. Shaft 334 has a point, i.e., tip 33, at one end and is flat at the other. The pointed end, i.e., tip 33, normally protrudes from erase end 31 of the light pen, while the other end of shaft 334 rests near but not in physical contact with armature 335. Spring 333 is concentrically wrapped around the shaft. One end (not shown) of the spring is secured to shaft 334 and the other end is physically attached to retaining wall 380. Shaft 334 can move horizontally through a hole (not shown) in wall 380. As long as tip 33 is not depressed, the switch remains in the open position shown in FIG. 3. However, whenever the tip is depressed, shaft 334 is pushed into the housing of the pen. This compresses spring 333 and causes armature 335 to rest against contact 331 thereby establishing a contact closure between it and this contact. As soon as pressure is removed from tip 33, spring 333 elongates and moves shaft 334 and armature 335 to their normal positions shown in FIG. 3.

Figure 4:
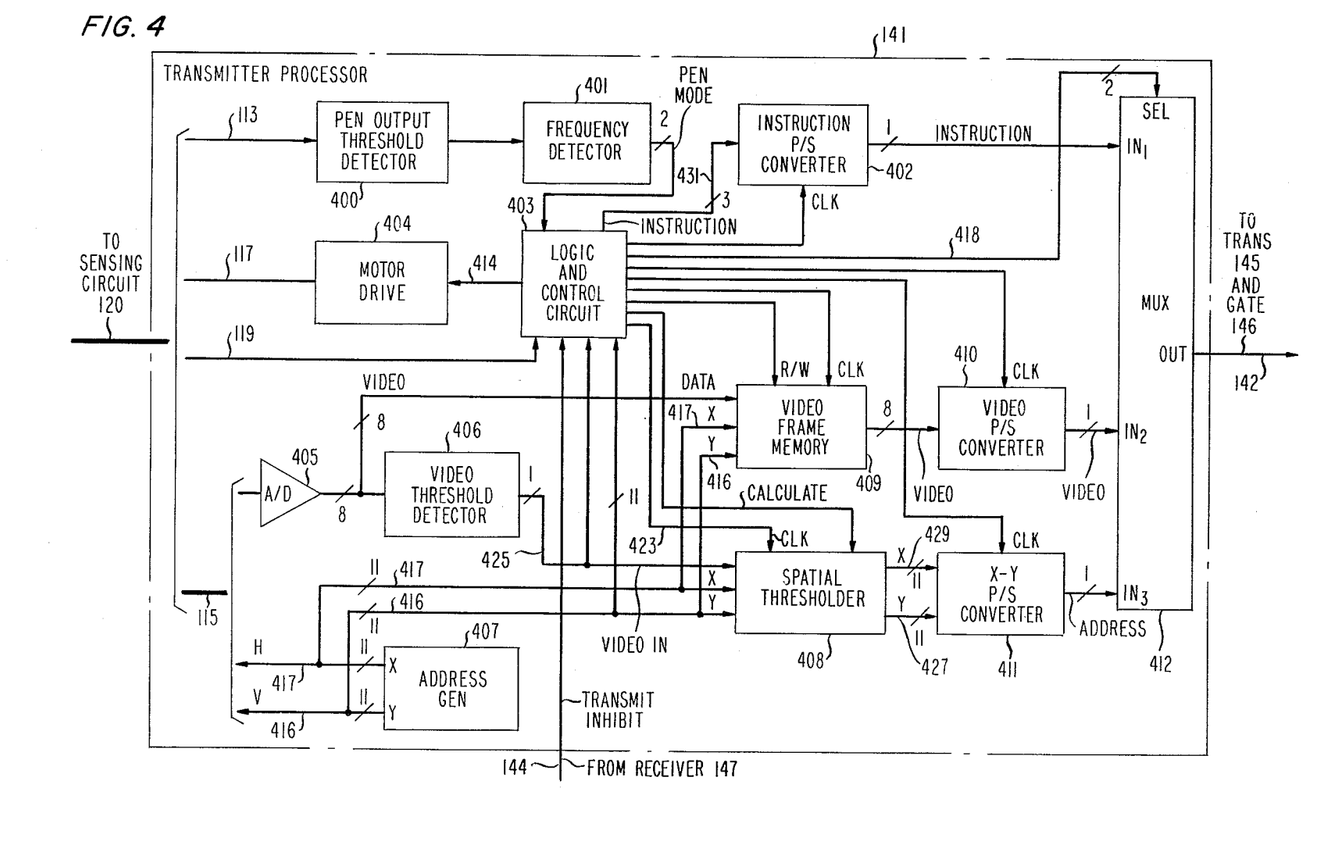
FIG. 4 is a detailed block diagram of the circuitry comprising transmitter processor 141 located within transmit/receive circuitry 140 shown in FIG. 1.

FIG. 4 depicts the circuitry comprising transmitter processor 141.

Video camera 125 (shown in FIG. 1), under the control of address generator 407, continuously scans graphic image area 210 (shown in FIG. 2) regardless of the particular graphical transmission operation being performed by transmitter processor 141. This address generator produces two 11-bit addresses which at any instant specify which particular pel, comprising illustratively 2048 by 2048 pels in the graphic image area, the video camera is to scan. The vertical (V) address appearing at the Y output of the address generator and applied to lead 416 specifies which one of 2048 scan lines is to be scanned, and the horizontal (H) address appearing at the X output and applied to lead 417 specifies which particular one of the 2048 pels comprising the selected line is to be scanned. The topmost scan line in the image is arbitrarily assigned a vertical address of zero, and the first or leftmost pel in any line is arbitrarily assigned a horizontal address of zero. Address generator 407 increments the vertical address by one count and thereafter sequentially advances the horizontal address throughout its entire range and then continuously repeats this entire process. These addresses are extended to the video camera via lead 115. Consequently, the video camera is continuously and sequentially scanning the entire graphic image area 210 on a pel-by-pel basis. The rate at which the addresses are changed are such that one full image is scanned every 1/30th second. The resulting video output of the camera, an analog signal, is applied to transmitter processor 141, via leads 115, and more specifically, to analog-to-digital converter 405. The latter converts the analog video information for each pel, i.e., the intensity value of the detected light for that pel, into an 8-bit digital word. This digital video information is applied as input to both video threshold detector 406 and to the DATA input of video frame memory 409 (both of which will be discussed shortly).

During any interval of time in which the transmitter processor is awaiting a command from the conferee situated at the near end and is not processing graphical information for transmission, transmitter processor 141, under the control of logic and control circuit 403, assumes a default or wait state. During this state, (infrared) filter 127 (shown in FIG. 1) is electronically kept in a predetermined position such that it blocks any visible light from entering video camera 125. This latter function is performed by logic and control circuit 403 and motor drive 404. Specifically, logic and control circuitry 403 applies an appropriate voltage level to the input of motor drive 404 via lead 414 such that motor drive 404 produces the proper motor drive voltages on lead 117. Information regarding the position of filter 127 is fed back to logic and control circuit 403 by position transducer 116 via lead 119.

As is evident by now, logical control circuit 403 controls the operation of transmitter processor 141. This circuit is a sequential circuit which is capable of assuming a variety of states, with the particular state dependent upon the signals applied to the circuit's various inputs. Each particular state causes the circuit to produce various signals at its outputs, e.g., clock signals, which are used to evoke the various functions performed by transmitter processor 141 in the proper order. Logic and control circuit 403 can be implemented by using, for example, combinatorial logic. The design of multiple state sequential combinatorial circuits is described, for example, in Chapter 13, pages 778–844 of *Logic Design of Digital Systems* by D. L. Dietmeyer, published by Allyn and Bacon, copyright 1978; and in Chapter 5, pages 110–151 of *Digital Computer Design* by R. M. Kline, published by Prentice Hall, copyright 1977.

As previously discussed, the user can instruct the graphics communication terminal to transmit a snapshot image by tilting write end 32 of pen 30 downward and depressing its associated tip, i.e., tip 34 (shown in FIGS. 2 and 3) against any location in command detection area 220 (also shown in FIG. 2) not contained within the graphic image area. At the moment this occurs, write end 32 of the pen begins to emit pulses of infra-red light. These pulses are detected by photodetector 121 (shown in FIG. 1) and applied in electrical form via lead 113 to pen output threshold detector 400 contained within transmitter processor 141. This detector ascertains whether the electrical pulses are low amplitude, i.e., the result of noise, or high amplitude, i.e., the result of light pulses originating from light pen 30. If the pulses are high amplitude, threshold detector 400 properly shapes these pulses, and applies the result to frequency detector 401. Frequency detector 401 ascertains the frequency of these pulses and, in response thereto, produces a two-bit binary signal which specifies the current mode of the light pen. This signal can take on any one of four values to correspond with the particular one of the four possible modes in which the pen could be used. As previously discussed, only three of these are used in the present illustrative embodiment to evoke graphical modification operations; the fourth is ignored by frequency detector 401. The two-bit parallel mode information produced by frequency detector 401 is applied to logic and control circuit 403, which decodes the mode information.

However, this two-bit mode information is insufficient by itself to select any one out of the five possible graphical modification operations. For example, the two-bit mode information for the snapshot operation, produced by frequency detector 401, could specify either a snapshot or a write operation. To further select the snapshot operation, transmitter processor 141 determines whether the operative end of the pen is held above a location (within command detection area 220) within or outside graphic image area 210. In the event the operative end is held above any location in graphic image area 210, then the infra-red light pulses produced by the pen are detected and converted to an analog form by video camera 125 as it scans that area. An eight-bit digital representation of the amplified pulses formed by analog-to-digital converter 405, is then applied to the input of video threshold detector 406. If the pulses are of sufficient amplitude, i.e., not noise, then the video threshold detector squares these pulses and applies the result to logic and control circuit 403. In response thereto, logic and control circuit 403 generates an appropriate three-bit binary signal—an instruction——and applies it via lead 431 to instruction parallel-to-serial converter 402. This instruction uniquely defines the write operation when the user holds the pen as described above. If, on the other hand, the operative end is held above a location outside graphic image area 210 but within command detection area 220, video camera 125 does not detect the infra-red pulses emitted from the operative end of the pen. Consequently, logic and control circuit 403 does not receive any pulses from video threshold detector 406 and in response thereto generates a three-bit instruction which uniquely defines the snapshot operation. This instruction is similarly applied via lead 431 to the input of instruction parallel-to-serial converter 402. In response to the value of the instruction, logic and control circuit 403 controls the remaining circuitry within the transmitter processor to perform the particular operation commanded by the user. For purposes of the remaining discussion, the level of the transmit inhibit signal appearing on lead 144 is assumed to be low.

After the snapshot instruction has been generated, logic and control circuit 403 applies a stream of clock pulses to the clock input of instruction parallel-to-serial converter 402 and simultaneously therewith applies an appropriate two-bit select signal, via lead 418, to the select input of multiplexor 412. This select signal causes the multiplexor to route any signal applied to its first input, $IN_1$, to its output. Instruction parallel-to-serial converter 402, in response to the applied clock pulses, converts the three-bit instruction into a serial bit stream. This bit stream is then routed through multiplexer 412 and applied via lead 142, to transmitter 145 and gate 146 (shown in FIG. 1).

To complete the snapshot operation, transmitter processor 141 serially applies a full image, on a pel-by-pel basis, of the video (including graphical) information appearing in the graphic image area to its output lead 142. Specifically, while the snapshot instruction is being transmitted, logic and control circuit 403 prepares sensing circuit 120 to scan and detect any video—including graphical—information appearing in graphic image area 210. Specifically, logic and control circuit 403 commands motor drive 404, via an appropriate signal placed on lead 414, to position (infra-red) filter 127 away from the lens of video camera 125 such that any visible light reflecting off the graphic image area will pass unobstructed into the lens of video camera 125. As soon as the filter is completely moved away from the input to camera 125, position transducer 116 (shown in FIG. 1) signals this occurrence, via lead 119. In response thereto, logic and control circuit 403 thereafter applies a sufficient signal to motor drive 404 to keep the filter in that position during the remainder of the snapshot operation.

Thereafter, logic and control circuit 403 prepares itself to apply a stream of clock pulses to the clock input of video frame memory 409. This stream begins whenever the value of the 11-bit vertical scanning address, appearing on lead 416 and produced by address generator 407, first becomes zero, i.e., at the start of the scanning of the first scanning line in the image. This stream of clock pulses continues until the vertical scanning address again becomes zero, i.e., after the entire image of the graphic has been scanned. Simultaneously therewith, logic and control circuit 403 also applies an appropriate signal to the read/write control input of video frame memory 409 instructing it to write the 8-bit information applied to its DATA input into a memory location defined by the address appearing on leads 416 and 417. Consequently, as each pel comprising the graphic image area is scanned, its associated eight-bit intensity value appearing at the DATA input is written into a corresponding memory location in the video frame memory 409. After the frame has been completely scanned, i.e., when the value of vertical address again becomes zero, logic and control circuit 403 applies an appropriate signal to the read/write control input of the video frame memory 409 to condition the memory to read out the stored intensity values to the memory's 8-bit output. Logic and control circuit 403 simultaneously applies a two-bit control signal to the select input of multiplexor 412 to cause the multiplexor to route any signal appearing at its second input, $IN_2$, to its output and in turn to lead 142. Logic and control circuit 403 now applies both another stream of clock pulses to video frame memory 409, in synchronism with the incrementing vertical and horizontal addresses appearing on leads 416 and 417, and a corresponding synchronized stream of clock pulses to video parallel-to-serial converter 410. In response to the first stream, video frame memory 409 sequentially applies the stored contents at each of its addressed locations, via the memory's eight-bit output, to video parallel-to-serial converter 410 which, in response to the second stream, converts this 8-bit information into serial form. The resulting serial information is applied to input $IN_2$ of multiplexor 412 and is applied in turn, via lead 142, to transmitter 145 and gate 146. This operation continues until the contents of the last location in video frame memory 409 have been converted into a serial bit stream and applied to lead 142, i.e., when the value of vertical address appearing on lead 416 again becomes zero. As soon as this occurs, the snapshot operation is completed and logic and control circuit 403 enters the wait state. As noted during this state, logic and control circuit 403 commands motor drive 404 to position (infra-red) filter 127 in front of the lens of video camera 125.

After the snapshot operation is completed, the conferee, as previously described, can, by employing light pen 30, instruct the graphic transmission system to perform any one of three graphic transmission operations to change the image of the graphic that has been transmitted. These operations are: erasing information, emphasizing existing information, or writing new information. To effectuate any of these three change operations, transmitter processor 141 ascertains the mode of light pen 30 and in response to both the mode information and the location of the operative tip, first generates appropriate instruction and address information. It then applies the appropriate instruction followed by the associated address information to output lead 142. Alternatively, the conferee can also instruct the graphic transmission system to perform a restore operation or transmit another snapshot image. As previously discussed, the restore operation reverses the most recent graphical change operation and causes an image of a previously transmitted graphic to be displayed as it existed prior to the most recent change operation. As will become evident shortly, no address information is required for a restore operation. Consequently, transmitter processor 141 effectuates this operation by merely transmitting the appropriate instruction alone. At the conclusion of any of these five operations, (erase, emphasize, write, restore and snapshot) transmitter processor 141 re-enters the wait state.

Instructions for the erase, emphasize, write and restore operations are generated and transmitted in an identical manner to that described above for the snapshot operation. Address information is generated in the following manner. While logic and control circuit 403 detects the mode information produced by light pen 30, it also determines the location of the operative tip of the pen. As previously discussed, logic and control circuit 403 will have positioned filter 127 in front of the lens of the video camera during the wait state preceeding any of these four operations. Throughout any of these four operations, logic and control circit 403 applies an appropriate voltage level to lead 414 to command motor drive to maintain filter 127 (shown in FIG. 1) in its present position. Position transducer 116 (also shown in FIG. 1) applies a feedback signal via lead 119 to logic and control circuit 403, regarding the present position of filter 127. As previously noted, filter 127 restricts the video camera to detecting only the light emitted from the pulsing tip of the pen.

As noted, address generator 407 produces two continuous streams of incrementing addresses to video camera 125 via leads 416 and 417. Whenever the pulsing end of the light pen is positioned over the particular pel in the graphic image area defined by the addresses present on leads 416 and 417, the video camera detects only the pulsing light and applies a pulse to its output lead. Analog-to-digital converter 405 converts the amplitude of the pulse into an 8-bit digital form, and feeds the result to the input of video threshold detector 406. The level detector first determines whether the pulse is of sufficient amplitude, and, if so, then applies a rectangular pulse to the video input of spatial thresholder 408 via lead 425. The vertical and horizontal addresses produced by address generator 407 are also applied as inputs to the spatial thresholder.

Because the operative end of the light pen emits infrared light equally in all directions outward from its housing, the radiation pattern of this light striking the graphic image area, which lies below, i.e., in front of that end of the pen, is somewhat circular. As the operative end of the pen is moved farther away from the graphic image area, the diameter of the circular radiation pattern increases. If the pen is held too far above the graphic image area, then disadvantageously an excessively large portion of the graphic could be changed with a very small movement of the pen. To prevent this, spatial thresholder 408 counts the number of individual pels lying within the radiation pattern to determine the size of the pattern. It accomplishes this by counting, while the image of the graphic image area is being scanned, the number of different applied vertical and horizontal addresses at which a pulse concurrently appears at its video input. If the resulting number is too large, illustratively 16 or more, then no address information is transmitted for this graphical modification. Even though, by this time, the transmitted instruction for the graphical modification operation will have been decoded in both receiver processor 143 and far end graphical communication terminal 100' (shown in FIG. 1), the displayed graphic appearing on both the near-end and far-end display terminals is not modified due to the absence of the necessary accompanying address information.

If, on the other hand, the number of pels is sufficiently small, then the spatial thresholder, in a manner described in much greater detail in conjunction with FIG. 6, calculates the pel location lying closest to the center location of the radiation pattern (hereinafter referred to as the center location). This calculation, more particularly, occurs immediately after the entire video frame is scanned, i.e., at the instant after scanning has begun when the value of the vertical address present on lead 416 becomes zero. At that time, logic and control circuitry 403 applies a level change, via lead 420, to the calculate input of spatial thresholder 408 to initiate calculation of the center location. At the conclusion of these calculations, the spatial thresholder applies the resulting X and Y addresses of the center location, each in 11-bit form, to output leads 429 and 427, respectively. Shortly thereafter, logic and control circuit 403 completes the transmission of the graphical modification, i.e., transmission of the address information, by applying a two-bit control signal to multiplexor 412 to cause it to route any signal appearing at the multiplexor's third input, IN$_3$, to its output terminal and in turn to lead 142. Simultaneously therewith, the logic and control circuit applies a series of clock pulses to X-Y parallel-to-serial converter 411 causing it to convert the X-Y address information, produced by spatial thresholder 408 and appearing on leads 427 and 429, into a serial signal which is in turn applied to IN$_3$. Throughout, all operations of spatial thresholder 408, logic and control circuit 403 applies all the necessary clock pulses to the spatial thresholder to properly control its operation.

As previously discussed, receiver 147 places a high level signal on transmit inhibit line 144 whenever it detects information incoming from the far end over communication line 190 (shown in FIG. 1). This signal is extended via lead 144 to logic and control circuit 403. Whenever this signal is high, logic and control circuit 403 does not apply both a select signal to multiplexor 412 and clock pulses to any of the parallel-to-serial converters, i.e., instruction parallel-to-serial converer 402, video parallel-to-serial converter 410 and X-Y parallel-to-serial converter 411. This effectively prevents any information from being applied to lead 142, and in turn transmitted to far end terminal 100. If this high level signal occurs during any graphical transmission operation, the instruction, address information and pel intensity values generated in the course of that operation are preserved in the appropriate parallel-to-serial converters and in the video frame memory. This stored information is then transmitted whenever receiver 147 removes the high level signal from transmit inhibit line 144.

Figure 5:
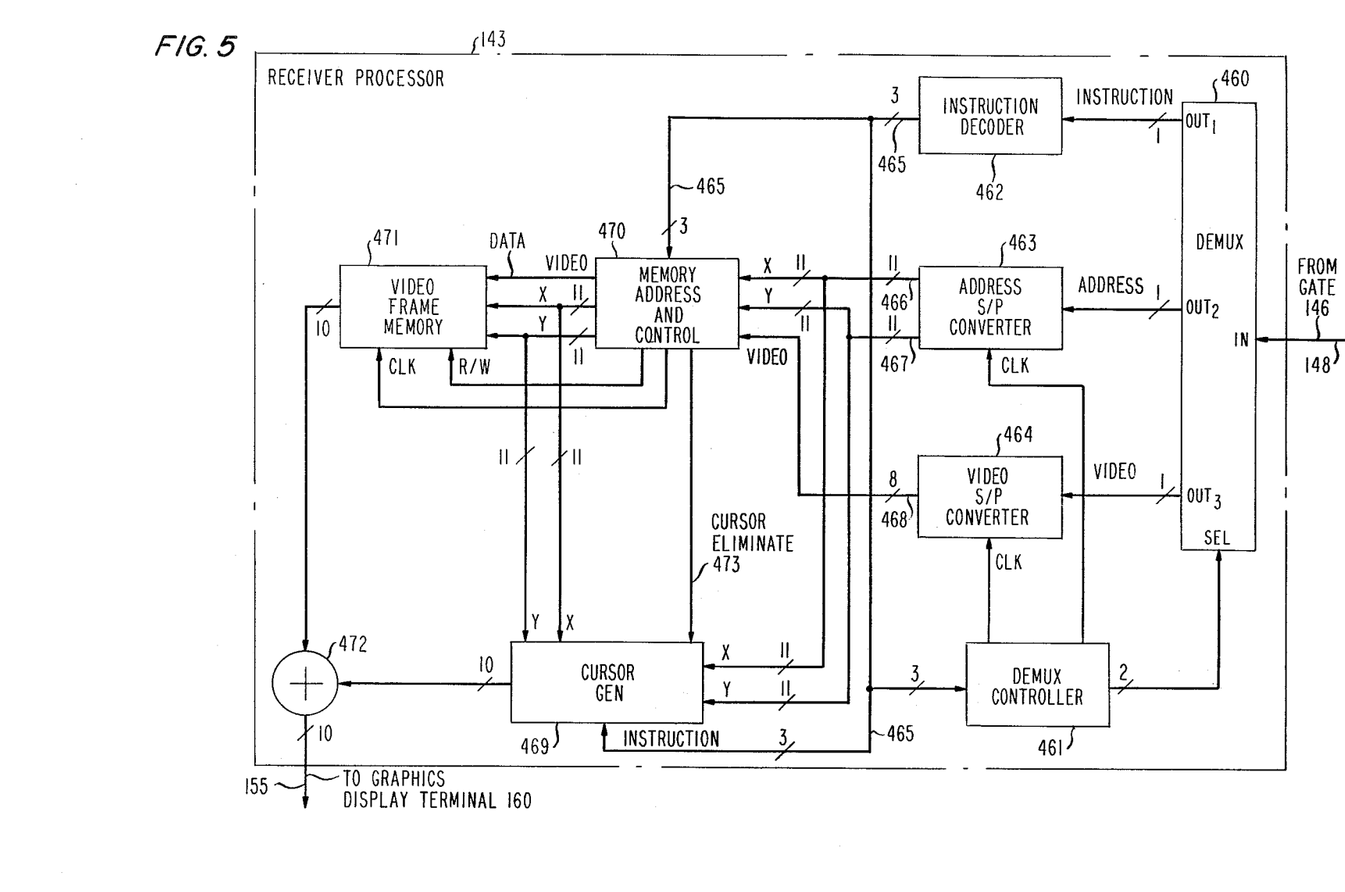
FIG. 5 is a detailed block diagram of the circuitry comprising receiver processor 143 located within the transmit/receive circuitry 140 shown in FIG. 1.

FIG. 5 depicts the circuitry comprising receiver processor 143 which, as noted, interprets transmitted graphical information generated locally at the near end or incoming from the far end, and changes the image displayed on graphics display terminal 160 in accordance therewith.

A stream of serial graphical information which is derived, as previously discussed, from either transmitter processor 141 or receiver 147 and passed through gate 146, appears on input lead 148 and is applied to the input of demultiplexor 460. Under the control of demultiplexor controller 461, demultiplexor 460 applies the first three bits in the stream to instruction decoder 462. These three bits, as previously described, define the instruction contained within this serial stream. Decoder 462 first ascertains the particular instruction defined by these three bits and then applies a three-bit control signal, having a value corresponding to the particular instruction, via lead 465, to control the subsequent operation of memory address and control circuit 470, cursor generator 469 and demultiplexor controller 461. Decoder 462 can be designed to operate asynchronously, i.e., its timing is solely governed by that of the serial information applied to it, or synchronously, via a clock signal produced by demultiplexor controller 461 and extended by a lead (not shown) to the decoder.

If the instruction is "snapshot," then the various memory locations of video frame memory 471 are sequentially filled on a pel-by-pel basis with a frame of serial graphical information appearing on lead 148. Specifically, memory address and control 470 first conditions video frame memory 471, via its read/write input, to write any video data appearing at its data input into an addressed location. Simultaneously therewith, demultiplexor controller 461, in response to the "snapshot" instruction produced by instruction decoder 426, changes the two-bit control signal applied to the select input of demultiplexor 460 such that the frame of serial graphical information, subsequently appearing on lead 148, is routed by demultiplexor 460 to its third output, OUT$_3$. Thereafter, demultiplexor controller 461 applies a stream of clock pulses to video serial-to-parallel converter 464 causing it to convert the serial video information associated with each pel into an eight-bit word. Each resulting eight-bit word is applied, via lead 468, to the video input of memory address and control 470.

Each location within frame memory 471 stores ten bits of information for each pel. Of these ten bits, the eight most significant bits, i.e., bits one through eight, are used to store the eight bit intensity value associated with each pel. As described in greater detail below, bits 9 and 10—when either is set to a "1"—signify that the associated pel's intensity value has been changed by either the erase or write graphical change operation, respectively. Whenever bit 9 or bit 10 associated with any pel is set to a "1", this commands the near end graphical display terminal to display that pel with either minimum or maximum intensity, respectively.

As noted, memory address and control 470 produces two streams of consecutive 11-bit (X and Y) addresses which are used to access memory locations within video frame memory 471. Shortly before the video information associated with the first pel appears at this input, memory address and control 470 sets the values of these two addresses to those associated with the first location in the memory. The video information associated with the first pel is then written, at the occurrence of an appropriate clock pulse produced by memory address and control 470, into the first location in video frame memory 471 and, more specifically, into the eight most significant bits at that location. Memory address and control 470 also sets the values stored in bits 9 and 10, at that memory location, to zero. Thereafter, memory address and control 470 increments the memory addresses and writes the video information associated with the next pel into the succeeding location and repeats the process until video frame memory 471 has been completely filled with an entirely new frame of video information.

Periodically, throughout the entire operation of receiver processor 143, all the locations comprising video frame memory 471 are sequentially addressed, by memory address and control circuitry 470, and all ten bits of information stored within each location in the memory are sequentially applied at an extremely high rate, to the memory's output. From there, these values are applied, via adder 472 and lead 155, to graphics display terminal 160 to update the information then being displayed on the display screen. The eight-bit intensity value associated with any pel is displayed unless bits 9 or 10 associated with that pel is set. If bit 9 is set to a "1" then, as noted, this pel is displayed with minimum intensity. Alternatively, if bit 10 is set to a "1", then this pel is displayed with maximum intensity. This entire operation is known as "refresh" and its occurrence is controlled by well known circuitry existing within memory address and control circuitry 470.

If, however, the instruction is "write," then a "1" value is stored within bit 10 of a selected pel such that the intensity value associated with that pel will be displayed with maximum intensity after the next successive display refresh. Specifically, memory address and control 470 first instructs video frame memory 471, via its read/write input, to write data into an addressed location. Simultaneously therewith, demultiplexor controller 461 changes the two-bit control signal applied to demultiplexor 460 such that the remaining serial information appearing on lead 148, i.e., the address of the particular pel whose intensity value is to be changed, is routed by the demultiplexor to the input of address serial-to-parallel converter 463. Thereafter, this converter, under the control of clock pulses produced by demultiplexor controller 461, converts the incoming serial address information into two 11-bit addresses, i.e., X and Y addresses, and in turn applies the result to memory address and control 470. In response thereto, memory address and control 470 writes a "1" bit into bit 10 of the location within video frame memory 471 specified by the value of X and Y addresses leaves bits 1 through 8 unchanged and changes the value of bit 9 to a "0" if the value of the bit was previously set to a "1." As a result, the value stored in this memory location is "XXXXXXXX01" (where X can be either a "1" or "0"), which has the effect of producing the maximum visual intensity on the display surface of graphics display terminal 160 at the selected location.

If, however, the ascertained instruction is "erase," then a "1" value is stored within bit 9 of a selected pel such that the intensity value associated with that pel will be displayed with minimum (or zero) intensity after the next successive display refresh. Specifically, receiver processor 143 performs in the same manner as that described for the write operation, except that a "1" is written into bit 9 of the selected location within frame memory 471 and the value of bit 10 is changed to a "0" if it was previously set to a "1." In this case, the value stored in this location is "XXXXXXXX10" (where X can be either a "1" or "0"), which has the effect of producing the minimum (or zero) visual intensity on the display surface of graphics display terminal 160 at the selected location.

If the instruction is "emphasize," cursor generator 469 places a cursor (a specific pattern being, illustratively, a brightly lit square or cross) centered at one or more selected pels on the display surface of graphics display terminal 160. Specifically, cursor generator 469 is enabled whenever the instruction appearing on lead 465 takes on the particular value associated with the emphasize instruction. In addition, this instruction causes demultiplexor controller 461 to change the two bit select signal applied to demultiplexor 460 such that the remaining serial information appearing on lead 148, i.e., the address of the particular pel location to be emphasized, is routed to the input of address serial-to-parallel converter 463. This converter, under the control of an appropriate stream of clock pulses produced by demultiplexor controller 461, converts this incoming address information into two 11-bit addresses which are in turn applied to cursor generator 469. In response thereto, the cursor generator determines and stores the X and Y addresses of the first pel location to be addressed, by memory address and control 470, which forms part of every cursor which the conferee desires to display.

Whenever the emphasize operation is enabled, then during the next successive refresh operation, cursor generator 469 compares each of the addresses applied to video frame memory 471 with those which were previously stored within the cursor generator. When a match is found, thereby indicating that the first pel which is to comprise a cursor is being concurrently addressed by memory address and control 470, cursor generator 469 applies a predetermined eight-bit signal to its output. This signal and the ouput of video frame memory 471, i.e., the intensity value of the addressed pel, are additively combined in adder 472. The result is applied via lead 155 to graphics display terminal 160. The value of this predetermined signal is such that, when added to the intensity value of the addressed pel in video frame memory 471, the result causes this addressed pel to be illuminated on the display surface with maximum intensity. The remaining pels which comprise the specific pattern (e.g., a square or cross) for this cursor are likewise illuminated by cursor generator 469 when these pels are specifically addressed by memory address and control circuit 470. The persistence of the display surface and a fast periodic refresh rate (e.g., refreshing every 1/30th second) cause the viewer to collectively perceive all these fully illuminated pels as a cursor. These cursors are continuously displayed with each subsequent refresh cycle until any conferee evokes a graphical transmission operation other than "emphasize." When that occurs and as soon as a different instruction is ascertained by demultiplexor controller 461, cursor generator 469 clears its internal storage. This eliminates any cursors from being displayed during the next refresh operation.

Alternatively, it can be readily appreciated that the emphasize operation could be configured such that the emphasize instruction causes any selected pel to be displayed with maximum intensity only while the write end of the light pen is held over that pel. Specifically in this case, cursor generator 469 in response to the emphasize instruction, could store the pair of X and Y addresses subsequently produced by address serial-to-parallel converter 463. During the subsequent refresh cycle, cursor generator 469 would then generate the predetermined eight-bit signal and apply it to an input of adder 472—to cause the selected pel to be displayed with maximum intensity on the display surface of graphics display terminal 160—whenever that pel associated with that stored address is concurrently being addressed by memory address and control 470. These stored X and Y addresses would change whenever the light pen, operated in the emphasize mode, is positioned over a different selected pel. Operation in this fashion would permit the system to accommodate the natural way in which people, e.g., conferees, want information to be emphasized, i.e., only as long as they specifically point to it.

Lastly, if the instruction is "restore," then all the graphical change operations, i.e., "erase" or "write" which occurred after the most recent snapshot image has been transmitted, are reversed such that during the next successive refresh operation the graphic which is displayed is the most recently transmitted, "snapshot" image. Specifically, memory address and control 470 (a) resets bits 9 and 10 to "0" in all the locations within frame memory 471 and (b) clears the internal storage within cursor generator 469 via the application of a high level signal to CURSOR ELIMINATE lead 473. Thus, after the next refresh operation, the eight-bit intensity value, associated with every pel and produced during the most recent snapshot image, is displayed without any cursors.

Figure 6:
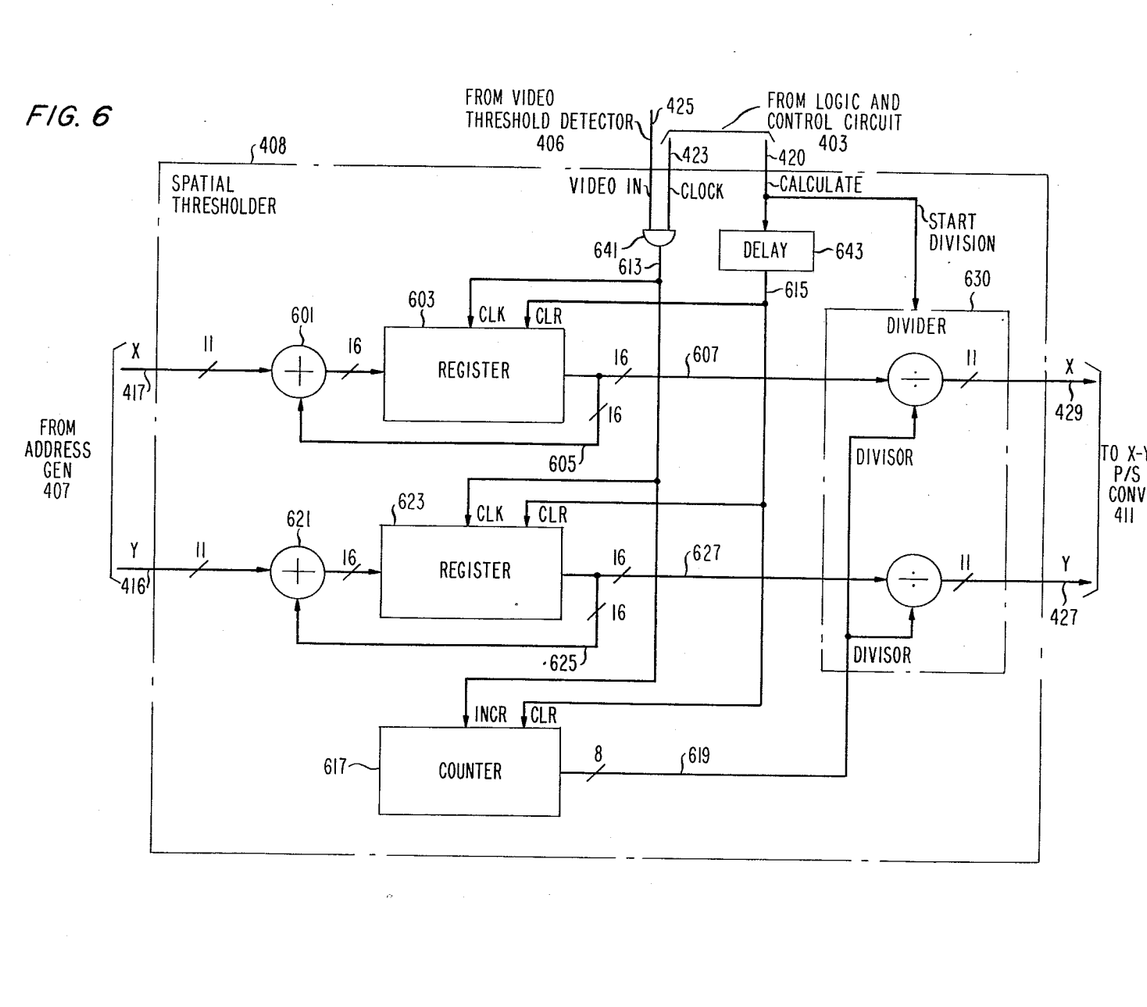
FIG. 6 is a detailed block diagram of spatial thresholder 408 shown in FIG. 4.

The circuitry comprising spatial thresholder 408 (shown in FIG. 4) is depicted in FIG. 6. As previously discussed, this circuit determines whether the light pen is held too far above the graphic image area. Specifically, as noted, the spatial thresholder first counts the number of pels within the graphic imge area, which during any scan of this area by the video camera, lie within the circular radiation pattern produced—as previously discussed—whenever the infra-red pulsing light emitted from the light pen strikes this area. If the resulting count is sufficiently low i.e. 16 or less, then the spatial thresholder calculates the X and Y addresses of the center of the radiation pattern and thereafter applies these addresses to its output leads. Alternatively, if the count is excessive, i.e., greater than 16 for example, then the spatial threshold inhibits these calculations and does not apply any address information to its output leads.

Specifically, whenever a pulse, as previously discussed, is produced by video threshold detector 406 (shown in FIG. 4) during any scan of the graphic image area and applied to lead 425, this pulse indicates that the particular pel, currently specified by the X and Y addresses appearing on leads 417 and 416, respectively, lies within the radiation pattern produced by the pulsing tip of the light pen. Shortly after the occurrence of the leading edge of this pulse, logic and control circuit 403 applies a clock pulse, via lead 423, to the clock input of spatial thresholder 408. This latter pulse clocks the pulse produced by the threshold detector through AND gate 641 and applies it, via lead 613, to the clock inputs of registers 603 and 623. This, in turn, loads the 11-bit outputs produced by adders 601 and 621 into registers 603 and 623, respectively. These outputs are the additive combinations of the present contents of registers 603 and 623, applied via feedback paths 605 and 625, respectively, and the current X and Y addresses produced by address generator 407 (shown in FIG. 4) and appearing on leads 417 and 416, respectively. Thus, registers 603 and 623 maintain a running total, or summation, of the values of the X and Y addresses comprising the pels which during any scan of the graphic image area lie within the radiation pattern. Simultaneously therewith, the pulse applied to lead 613 is also applied to counter 617 causing it to increment its contents by one. This counter maintains a count of the number of pels which lie within the radiation pattern. The above totaling and counting operations continue until the entire graphic image area has been scanned. At that point, counter 617 contains the total number of pels which lie within the radiation pattern, and registers 603 and 623 contain respective totals of their X and Y addresses.

Thereafter, at the instant scanning begins again at the first pel in the graphic image area, logic and control circuit 403 (shown in FIG. 4), applies a pulse, via lead 420, to the calculate input to spatial thresholder 408. This pulse is directed both to the start division control input of divider 630 and to the input of delay element 643. In response to this pulse, divider 630 loads its input registers (not shown) with the values of the totalized X and Y addresses contained in registers 603 and 623, respectively, and the count contained in counter 617. If the value of the count is equal to or below a predetermined number, e.g., 16, then divider 630 computes the center location of the radiation pattern by dividing both the totalized X and Y addresses by the value of the count. The resulting X and Y addresses of the center location are then applied to output leads 429 and 427, respectively. However, if the count is greater than the predetermined number, well-known circuitry (not shown) located within divider 630 completely inhibits the divide operation and prevents divider 630 from applying any signal to its output leads. Divider 630 may advantageously be implemented using a microprocessor with the divide and inhibit operations controlled by and implemented in appropriate software routines.

The calculate pulse, after having been delayed for a predetermined interval in delay element 643, is applied to the clear inputs of registers 603 and 623 and counter 617. This, in turn, sets the contents of these two registers and the counter to zero in preparation for an accurate address totalization and pel count during the next scan of the graphic image area. This delay interval is chosen to be sufficently long such that the contents of registers 603 and 623 and counter 617 are completely loaded into the input registers contained within divider 630 before the then-existing contents of these registers and the counter are set to zero.

Since each address applied, via leads 416 or 417, to the spatial thresholder is 11 bits wide, a summation of 16 such addresses will produce a result which is 16 bits wide. Consequently adders 601 and 621, and registers 603 and 623, as well as their interconnecting leads, i.e., feedback paths 605, 625 and leads 607 and 627, are at least 16 bits wide.

While the graphical communication system has been described above in terms of a black and white, or two color, system, i.e., one in which each pel on the display screen can only assume one color when it is illuminated, e.g., white or green, and another, e.g., black, when it is not, it can be readily appreciated by those skilled in the art that the above-described system can be readily expanded to a multi-color system. In such a system, each pel can take on any one of a variety of different colors, e.g., one of $2^8$ or 256, when illuminated. This can be readily accomplished by substituting a color video camera for the one used in the sensing circuitry and by adding appropriate well known color processing circuitry to the transmitter and receiver processors located in each terminal. This circuitry would transmit and display an entire graphic and restore a previously transmitted graphic in full color. Specifically, snapshot transmission of color information can be simply accomplished by specifying the particular color for each pel using the 8-bit digital word serially transmitted for each pel during the snapshot operation. Appropriate circuitry in the graphic display terminal would then decode the 8-bit information for each pel and display the desired color for that pel on the display screen.

For the erase, write and emphasize operations, the additional circuitry would first cause a listing or "menu" of colors to be displayed at some point in transmission of the graphic, for example, before the snapshot image is transmitted or before the first change to that graphic can be made. After the user has selected a desired color using the light pen, for example, this color would be used in each of these three operations to effectuate the desired graphical changes, i.e., this color would be used to indicate deleted, new or emphasized graphical information. A separate color could also be selected for each type of graphical modification i.e., erase, write or emphasize, or for each particular graphical modification. Appropriate color information could easily be transmitted by appending a separate serial eight-bit stream to each address transmitted during each of these three operations. This eight bit stream would indicate the desired color for the particular addressed pel. Appropriate circuitry, for example a look-up table contained in a separate memory in, illustratively, the receiver processor, would decode the eight-bit word and cause the appropriate color to be displayed at the addressed pel.

Although a specific illustrative embodiment has been shown and described herein, this merely illustrates the principles of the present invention. Many and varied arrangements embodying those principles may be devised by those skilled in the art without departing from the spirit and scope of the invention.

What is claimed is:

1. Apparatus for communicating modifications to an image of a previously transmitted graphic, comprising
   means responsive to locations of a tip of a stylus with respect to the graphic for specifying addresses of image portions which are to be changed,
   means for defining instructions for changing the image of the graphic,
   means responsive to said specified addresses and said defined instructions for forming a modification communication, and
   wherein said defining means includes means responsive to tilt of the stylus for controlling the production of at least a portion of the defined instructions.

2. The invention in claim 1 wherein said controlling means further includes means for ascertaining whether an end of the stylus is tilted downward with respect to the other.

3. The invention in claim 2 wherein said ascertaining means includes means responsive to inclination of each end of said stylus with respect to the other for determining which end of said stylus is tilted downward.

4. The invention in claim 3 wherein said ascertaining means further includes means for generating a signal whenever the amount of inclination exceeds a predetermined threshold.

5. The invention in claim 4 wherein said defining means further includes means responsive to locations of a portion of a surface over which said downward tilted end of said stylus is placed for further defining said instruction.

6. The invention in claims 4 or 5 wherein said defining means further includes means responsive to depression of the downward tilted end of the stylus against the surface for further defining said instruction.

7. The invention in claim 6 said specifying means includes means for determining whether the downward tilted end of said stylus is held an excessive distance above said image portions.

8. The invention in claim 7 wherein said distance determining means further includes means for totaling the values of the addresses associated with picture elements comprising said surface and lying within a radiation pattern produced by light emitted from said stylus and striking said surface.

9. The invention in claim 8 in which said distance determining means further includes means for counting the number of said picture elements.

10. The invention in claim 9 in which said distance determining means further includes means for inhibiting the operation of said address specifying means in the event the value of said count exceeds a predetermined member.

11. The invention in claim 10 in which said forming means further includes means for transmitting said modification communication as said instruction followed by at least one of said addresses.

12. In a system for changing a displayed image of a previously transmitted graphic comprising
    means responsive to locations of a tip of a stylus with respect to the graphic for specifying addresses of image portions which are to be changed,
    means for defining instructions for changing the image of the graphic,
    means responsive to said specified addresses and said defined instructions for forming a modification communication,
    means for changing the displayed image in accordance with said modification communication, and
    wherein said defining means includes means responsive to tilt of said stylus for controlling the production of at least a portion of the defined instructions.

13. The invention in claim 12 wherein said controlling means further includes means for ascertaining whether an end of the stylus is tilted downward with respect to the other.

14. The invention in claim 13 wherein said ascertaining means includes means responsive to inclination of each end of said stylus with respect to the other for determining which end of said stylus is tilted downward.

15. The invention in claim 14 wherein said ascertaining means further includes means for generating a signal whenever the amount of inclination exceeds a predetermined threshold.

16. The invention in claim 15 wherein said defining means further includes means responsive to locations of a portion of a surface over which said downward tilted end of said stylus is placed for further defining said instruction.

17. The invention in claim 16 wherein said defining means further includes means responsive to depression of the downward tilted end of the stylus against the surface for further defining said instruction.

18. The invention in claim 17 wherein said specifying means includes means for determining whether the downward tilted end of said stylus is held an excessive distance above said image portions.

19. The invention in claim 18 wherein said distance determining means further includes means for totaling the values of the addresses associated with picture elements comprising said surface and lying within a radiation pattern produced by light emitted from said stylus and striking said surface.

20. The invention in claim 19 in which said distance determining means further includes means for counting the number of said picture elements.

21. The invention in claim 20 in which said distance determining means further includes means for inhibiting the operation of said address specifying means in the event the value of said count exceeds a predetermined number.

22. The invention in claim 21 in which said forming means further includes means for transmitting said modification communication as said instruction followed by at least one of said address.

23. The invention in claim 22 in which said displaying means includes means for extracting said instruction and said addresses present in said modification communication.

24. The invention in claim 23 in which said displaying means further includes means responsive to said addresses and said instructions for changing intensity values associated with those picture elements comprising said image portions, specified by said addresses, in a manner specified by said instructions.

25. In a stylus, capable of being used in a variety of modes to provide input information to an electrical system, an input signal generating system comprising
means for sensing whether an end of the stylus it tilted downward with respect to the other,
means for determining whether an end of said stylus is depressed against a surface, and
means responsive to said sensing and determining means for generating a plurality of signals indicative of which mode the stylus is being used.

26. The invention in claim 25 wherein said sensing means further includes means responsive to inclination of each end of said stylus with respect to the other for ascertaining which end of said stylus is tilted downward.

27. The invention in claim 26 wherein said sensing means further includes means for generating a signal whenever the amount of inclination exceeds a predetermined threshold.

28. The invention in claim 27 in which said sensing means is a mercury switch having two ends and a pair of contacts, situated in at least one end, which provides a conduction path when that end is tilted downward with respect to the other end.

29. The invention in claim 23 in which said determining means includes at least one pair of switch contacts situated in at least one end of the pen which closes whenever that end is depressed against a surface.

30. The invention in claims 28 or 29 in which said generating means includes means for producing a source of light pulses at a selected one of a plurality of predetermined rates wherein said rate is determined by which end of the pen is tilted downward with respect to the other and whether the downward tilted end of the pen is depressed against the surface.

31. The invention in claim 30 in which said producing means is comprised of at least one light illuminating device, which is located in a corresponding end of the pen.

* * * * *